United States Patent
Stopa

(10) Patent No.: US 11,229,186 B2
(45) Date of Patent: Jan. 25, 2022

(54) METHOD AND APPARATUS FOR COOLING OF MILK

(71) Applicant: DELAVAL HOLDING AB, Tumba (SE)

(72) Inventor: Jerzy Stopa, Tumba (SE)

(73) Assignee: DeLaval Holding AB, Tumba (SE)

( * ) Notice: Subject to any disclaimer, the term of this patent is extended or adjusted under 35 U.S.C. 154(b) by 0 days.

(21) Appl. No.: 16/470,016

(22) PCT Filed: Dec. 15, 2017

(86) PCT No.: PCT/SE2017/051283
§ 371 (c)(1),
(2) Date: Jun. 14, 2019

(87) PCT Pub. No.: WO2018/111184
PCT Pub. Date: Jun. 21, 2018

(65) Prior Publication Data
US 2020/0008389 A1  Jan. 9, 2020

(30) Foreign Application Priority Data
Dec. 16, 2016 (SE) .................... 1651660-1

(51) Int. Cl.
 *A01J 9/04* (2006.01)
 *A23C 3/04* (2006.01)
 (Continued)

(52) U.S. Cl.
 CPC ............... *A01J 9/04* (2013.01); *A01J 5/01* (2013.01); *A01J 5/0175* (2013.01); *A01J 11/00* (2013.01); *A23C 3/04* (2013.01); *F25D 31/003* (2013.01)

(58) Field of Classification Search
 CPC ...... A01J 9/04; A01J 5/007; A01J 5/01; A01J 5/017–5/0175; A01J 11/00; A23C 3/04; F25D 31/002; F25D 31/003; F25D 17/02
 (Continued)

(56) References Cited

U.S. PATENT DOCUMENTS 1,801,693 A * 4/1931 Ruff .......................... A01J 9/04
 165/74
2,089,024 A * 8/1937 Hapgood .................. A01J 9/04
 426/487
 (Continued)

FOREIGN PATENT DOCUMENTS

EP 0859545 B1 10/2000
EP 1251732 B1 10/2004
 (Continued)

OTHER PUBLICATIONS

International Search Report and Written Opinion, dated Mar. 2, 2018, from corresponding PCT application No. PCT/SE2017/051283.
(Continued)

*Primary Examiner* — Drew E Becker
(74) *Attorney, Agent, or Firm* — Nixon & Vanderhye

(57) ABSTRACT

A method for cooling milk in a milking arrangement, and a milk cooling apparatus of the milking arrangement that has a coolant circuit for heat exchange between milk and a coolant and a refrigerant circuit for heat exchange between a refrigerant and the coolant, where the method includes controlling the refrigerant circuit to maintain a predefined temperature range, receiving a first signal relating to commencement or increase of a milk flow from a milking system of the milking arrangement, starting or increasing circulation of coolant in the coolant circuit, and leading the milk flow through the milk cooling apparatus.

17 Claims, 3 Drawing Sheets

(51) Int. Cl.
*F25D 31/00* (2006.01)
*A01J 5/01* (2006.01)
*A01J 5/017* (2006.01)
*A01J 11/00* (2006.01)

(58) Field of Classification Search
USPC ..... 119/14.08, 14.09, 14.14–14.17; 426/524, 426/809
See application file for complete search history.

(56) References Cited

U.S. PATENT DOCUMENTS

| | | | | |
|---|---|---|---|---|
| 2,285,520 | A | | 6/1942 | Keyser |
| 2,511,582 | A | * | 6/1950 | Grindrod .............. F25D 31/002 62/98 |
| 2,571,923 | A | * | 10/1951 | Morrison ................. A01J 9/04 62/434 |
| RE23,544 | E | * | 9/1952 | Duncan .................. C07C 17/10 119/14.09 |
| 2,685,132 | A | * | 8/1954 | Karr ........................ A01J 9/04 165/118 |
| 2,854,827 | A | * | 10/1958 | Lockerbie ............. F25D 31/002 62/307 |
| 2,916,891 | A | * | 12/1959 | Swanson ............... F25D 31/002 62/161 |
| 2,934,821 | A | * | 5/1960 | Davis ...................... B26B 21/32 30/60.5 |
| 3,013,402 | A | * | 12/1961 | Brooker ................ F25D 31/006 62/171 |
| 3,035,543 | A | * | 5/1962 | Duncan ..................... A01J 7/00 119/14.09 |
| 3,448,589 | A | | 6/1969 | Marshall |
| 3,713,218 | A | * | 1/1973 | Laike ................... F25D 31/002 99/453 |
| 4,013,043 | A | * | 3/1977 | Kirwan ..................... A01J 7/00 119/14.09 |
| 4,351,271 | A | * | 9/1982 | Mueller ..................... A01J 9/04 119/14.09 |
| 4,612,537 | A | * | 9/1986 | Maltais .................. G05D 23/19 119/14.09 |
| 4,932,222 | A | * | 6/1990 | Adams, Jr. ............... A01J 9/04 165/104.31 |
| 5,701,756 | A | * | 12/1997 | Ghiraldi .................... A01J 9/04 62/393 |
| 5,792,964 | A | * | 8/1998 | van den Berg ........... A01J 5/01 73/861.15 |
| 5,957,081 | A | * | 9/1999 | van der Lely ........ A01J 5/0175 119/14.09 |
| 6,131,398 | A | * | 10/2000 | Versteijnen ............... A01J 9/04 62/435 |
| 6,769,261 | B2 | * | 8/2004 | Gustavsson ............... A01J 9/04 366/136 |
| 6,782,705 | B2 | | 8/2004 | Lidman et al. |
| 6,857,278 | B2 | * | 2/2005 | Gruber ...................... A01J 9/04 119/14.09 |
| 7,089,880 | B2 | | 8/2006 | Lidman et al. |
| 7,356,997 | B2 | * | 4/2008 | Gruber ...................... A01J 9/04 62/157 |
| 9,535,008 | B2 | | 1/2017 | Van Halsema et al. |
| 9,681,636 | B2 | | 6/2017 | Van Halsema et al. |
| 10,470,430 | B2 | * | 11/2019 | Stopa ..................... F28F 27/02 |
| 2003/0230243 | A1 | * | 12/2003 | Van Der Lely .......... A01J 9/04 119/14.08 |
| 2004/0112079 | A1 | * | 6/2004 | Omuta ................. B65D 88/744 62/435 |
| 2004/0129227 | A1 | * | 7/2004 | Lidman ..................... A01J 9/04 119/14.09 |
| 2006/0124065 | A9 | | 6/2006 | Lidman et al. |
| 2007/0272158 | A1 | * | 11/2007 | Kaever ...................... A01J 9/04 119/14.08 |
| 2011/0256288 | A1 | * | 10/2011 | Isenberg ................. A23L 3/001 426/520 |
| 2013/0269367 | A1 | * | 10/2013 | Meillan ..................... A23C 3/04 62/3.1 |
| 2017/0099801 | A1 | | 4/2017 | Van Tilburg et al. |
| 2017/0142937 | A1 | | 5/2017 | De Groot |
| 2017/0150695 | A1 | * | 6/2017 | Meillan ................ F25D 31/002 |
| 2017/0231188 | A1 | | 8/2017 | Stopa |
| 2017/0245455 | A1 | | 8/2017 | Van Halsema et al. |

FOREIGN PATENT DOCUMENTS

| | | | |
|---|---|---|---|
| WO | WO-0143535 A1 * | 6/2001 | ............... A01J 9/04 |
| WO | 01/56370 A1 | 8/2001 | |
| WO | 02/074069 A1 | 9/2002 | |
| WO | 2013/012320 A1 | 1/2013 | |
| WO | 2015/170970 A1 | 11/2015 | |
| WO | 2015/183076 A1 | 12/2015 | |
| WO | 2016/024905 A1 | 2/2016 | |

OTHER PUBLICATIONS

Swedish Search Report, dated Jul. 14, 2017, from corresponding SE application No. 1651660-1.

* cited by examiner

METHOD AND APPARATUS FOR COOLING OF MILK

TECHNICAL FIELD

The present invention relates to a method for cooling milk in a milking arrangement. The present invention further relates to a milk cooling apparatus for cooling milk in a milking arrangement.

BACKGROUND

Cooling of milk at a farm poses its particular problems. The milk milked from animals at the farm has to be cooled from animal body temperature to approximately 4 degrees Celsius as quickly as possible in order to prevent free fatty acids from forming and to prevent bacterial growth in the milk. Further, the milk must be prevented from freezing, which also is detrimental to milk quality. The milk may be cooled in a milk storage tank where it is stored prior to being transported to a dairy, in an intermediate milk tank, and/or in conduits leading to the milk storage tank or the intermediate milk tank.

EP 1251732 discloses a method and a system for controlling the cooling of small milk quantities in a cooling tank. The method and system are particularly adapted for cooling milk milked by an automatic milking system, AMS, wherein the milk is lead to the cooling tank when the cooling tank is empty or only contains a limited amount of milk. The cooling tank has a bottom wall portion with a milk cooling surface within the tank being part of a cooling circuit. The method comprises: a) providing a means for measuring the milk quantity in the tank, and a temperature transducer for monitoring the milk temperature in the tank, b) providing, in the cooling circuit, an evaporator connected to the bottom wall portion of the tank, a compressor, and a condenser, c) controlling the temperature of the refrigerant in the evaporator by regulating the vaporizing pressure, so that the temperature of the milk cooling surface is always higher than 0 degrees C., whereas the refrigerant temperature in the evaporator is below 0 degrees C. when the compressor is running.

As mentioned above, milk may be cooled in a conduit leading to a milk storage tank. For this purpose, a heat exchanger, such as e.g. a plate heat exchanger, PHE, may be arranged in the conduit. EP 0859545 discloses an apparatus for cooling a product such as milk comprising a first evaporator and a second evaporator, a first heat exchanger incorporating the first evaporator and a second heat exchanger incorporating the second evaporator. In operation, the milk is cooled in two stages. Heat is withdrawn from the milk by the first evaporator, cooling the milk to an intermediate temperature. During the second stage, heat is withdrawn from the milk by the second evaporator further cooling the milk to a desired temperature.

Whereas the heat exchanger of the apparatus for cooling milk disclosed in EP 0859545 comprises evaporators for a refrigerant, an apparatus for cooling milk may alternatively comprise a heat exchanger for cooling milk flowing to a milk storage tank, which heat exchanger is flowed through by a coolant, such as water and glycol, which coolant in turn is cooled by a refrigerant. One known manner of operating an apparatus for cooling of milk of the latter kind is to continuously pump coolant through the heat exchanger in order for milk to be cooled in the heat exchanger at all times. During cleaning of a relevant milking system pumping of the coolant is interrupted.

SUMMARY

It is an object of the present invention to provide a method for cooling milk, which provides for a low energy consumption.

According to an aspect of the invention, the object is achieved by a method for cooling milk in a milking arrangement. The milking arrangement comprises a milking system for extracting milk from at least one animal, a milk cooling apparatus for cooling milk, and a milk storage tank. The milk cooling apparatus is arranged in a milk flow path between the milking system and the milk storage tank and comprises a coolant circuit and a refrigerant circuit. The coolant circuit is configured for heat exchange between milk and a coolant and the refrigerant circuit is configured for heat exchange between a refrigerant and the coolant. The method comprises steps of:
  controlling the refrigerant circuit to maintain a predefined temperature range in at least one portion of the refrigerant circuit and/or in at least one portion of the coolant circuit,
  receiving a first signal relating to commencement or increase of a milk flow from the milking system towards the milk storage tank,
  starting or increasing circulation of coolant in the coolant circuit in response to the first signal,
  leading the milk flow through the milk cooling apparatus.

Since the refrigerant circuit is controlled to maintain a predefined temperature range in at least one portion of the refrigerant circuit and/or in at least one portion of the coolant circuit, and since the circulation of coolant in the coolant circuit is started or increased in response to the first signal, conditions are provided for the coolant to be cooled when there is a milk flow from the milking system to the milk storage tank, which milk flow requires cooling. Thus, energy may be saved during periods when there is no milk flow to the milk storage tank by not having to cool any coolant, or by only cooling a limited amount of coolant compared to when there is a milk flow to the milk storage tank. As a result, the above mentioned object is achieved.

The inventor has realised that the amount of coolant required to cool milk in a milking arrangement varies over time. In an automatic milking system, AMS, milk flow along the milk flow path leading from the AMS to the milk storage tank is intermittent. This is particularly so in milking systems where milk from only one or two AMS is conducted in the milk flow path to the milk storage tank. However, also in a milking arrangement with parlours configured for milking a higher number of animals than two, such as in a rotary parlour (manual or automated), or a herringbone or parallel parlour, milk flow may vary to such an extent that the milk cooling apparatus does not require continuous operation.

The milking system may be an AMS comprising teat cups, which are automatically attached to teats of animals. Alternatively, the milking system may comprise teat cups, which are manually attached to the teats of animals. Animals milked in the milking system may be e.g. cows, sheep, goats. The milking system extracts milk from the teats of animals in a known manner, e.g. utilising two-chamber teat cups and vacuum. In the milk storage tank milk is stored before being transferred to e.g. a dairy for processing of the milk. In the milk storage tank the milk is stored at a storage temperature, which prevents bacterial growth and the forming of free fatty acids.

A portion of the coolant circuit is arranged in the milk flow path between the milking system and the milk storage tank. The portion of the coolant circuit suitably comprises a heat exchanger configured for heat exchange between milk and the coolant. In the heat exchange between the coolant and the milk, the milk is cooled and the coolant is heated. The milk may be cooled substantially to the milk storage temperature by the coolant. In the heat exchange between the refrigerant and the coolant in the refrigerant circuit, the coolant is cooled by the refrigerant and the refrigerant is heated by the coolant. The refrigerant circuit as such may be automatically controlled in a known manner.

Although the average number of milking animals, such as cows, on farms is growing, there is a farm segment, such as organic farms, which has a comparatively low number of milking animals, which may be milked e.g. in an AMS. On the latter farm segment, the average milk flow over time is low. For low milk flow, so-called instant cooling, i.e. cooling to close to a storage temperature of the milk, is a good choice from e.g. a milk quality perspective. However, always having coolant of appropriate temperature standing by, as in prior art cooling systems consumes energy also when no milk is to be cooled. Accordingly, embodiments of the present invention provide an energy efficient provision of coolant, which makes available coolant ready for milk cooling when required.

According to embodiments, the step of starting or increasing circulation of coolant in the coolant circuit may comprise: —starting circulation of coolant in the coolant circuit in response to the first signal. The method may comprise a step of: —stopping the milk flow from the milking system. The method may thereafter comprise a step of: —stopping circulation of coolant in the coolant circuit. In this manner the circulation of coolant in the coolant circuit is started in response to the first signal, and stopped once milk flow has stopped, the coolant is only cooled as long as there is a milk flow from the milking system to the milk storage tank, which milk flow requires cooling. Thus, energy may be saved during periods when there is no milk flow to the milk storage tank.

According to embodiments, the step of starting or increasing circulation of coolant in the coolant circuit may comprise: —increasing circulation of coolant in the coolant circuit in response to the first signal form a low flow, energy saving, coolant circulation to a high flow, milk cooling, coolant circulation. The method may comprise further steps of: —stopping or decreasing the milk flow from the milking system, and —decreasing circulation of coolant in the coolant circuit back to the low flow coolant circulation. In this manner the circulation of coolant in the coolant circuit is increased in response to the first signal. Conditions are provided for a low flow rate of coolant when there is no milk flow to the milk storage tank, and a high flow rate of coolant when there is a milk flow to the milk storage tank. Thus, energy may be saved during periods when there is low or no milk flow to the milk storage tank.

According to embodiments of the method, during a time period when there is an absence of the first signal there may be performed a step of:
  circulating the coolant intermittently in the coolant circuit is performed until the coolant is at or below a second threshold temperature. In this manner the coolant may be maintained at a low temperature ready for cooling a milk flow from the milking system to the milk storage tank. The intermittent circulation may entail that the circulation of the coolant takes place at regular time intervals and/or that the circulation of the coolant is temperature controlled.

According to embodiments, the milking system may be an automatic milking system, AMS. According to alternative embodiments, the milking system may be a manual milking system, i.e. a milking system in which teat cups are attached manually to the teats of animals.

According to a further aspect of the invention, the above mentioned object is achieved by a milk cooling apparatus for cooling milk in a milking arrangement. The milking arrangement comprises a milking system for extracting milk from at least one animal, the milk cooling apparatus for cooling milk, and a milk storage tank. The milk cooling apparatus comprises a coolant circuit, a refrigerant circuit, and a milk cooling apparatus controller. The coolant circuit is configured for heat exchange between milk and a coolant and the refrigerant circuit is configured for heat exchange between a refrigerant and the coolant. The milk cooling apparatus controller is configured to:
  control the refrigerant circuit to maintain a predefined temperature range in at least one portion of the refrigerant circuit and/or in at least one portion of the coolant circuit,
  receive a first signal relating to commencement or increase of a milk flow from the milking system towards the milk storage tank, and
  start or increase circulation of coolant in the coolant circuit in response to the first signal.

Further features of, and advantages with, the present invention will become apparent when studying the appended claims and the following detailed description.

BRIEF DESCRIPTION OF THE DRAWINGS

Various aspects of the invention, including its particular features and advantages, will be readily understood from the example embodiments discussed in the following detailed description and the accompanying drawings, in which.

DETAILED DESCRIPTION

Aspects of the present invention will now be described more fully. Like numbers refer to like elements throughout. Well-known functions or constructions will not necessarily be described in detail for brevity and/or clarity.

Figure 1:
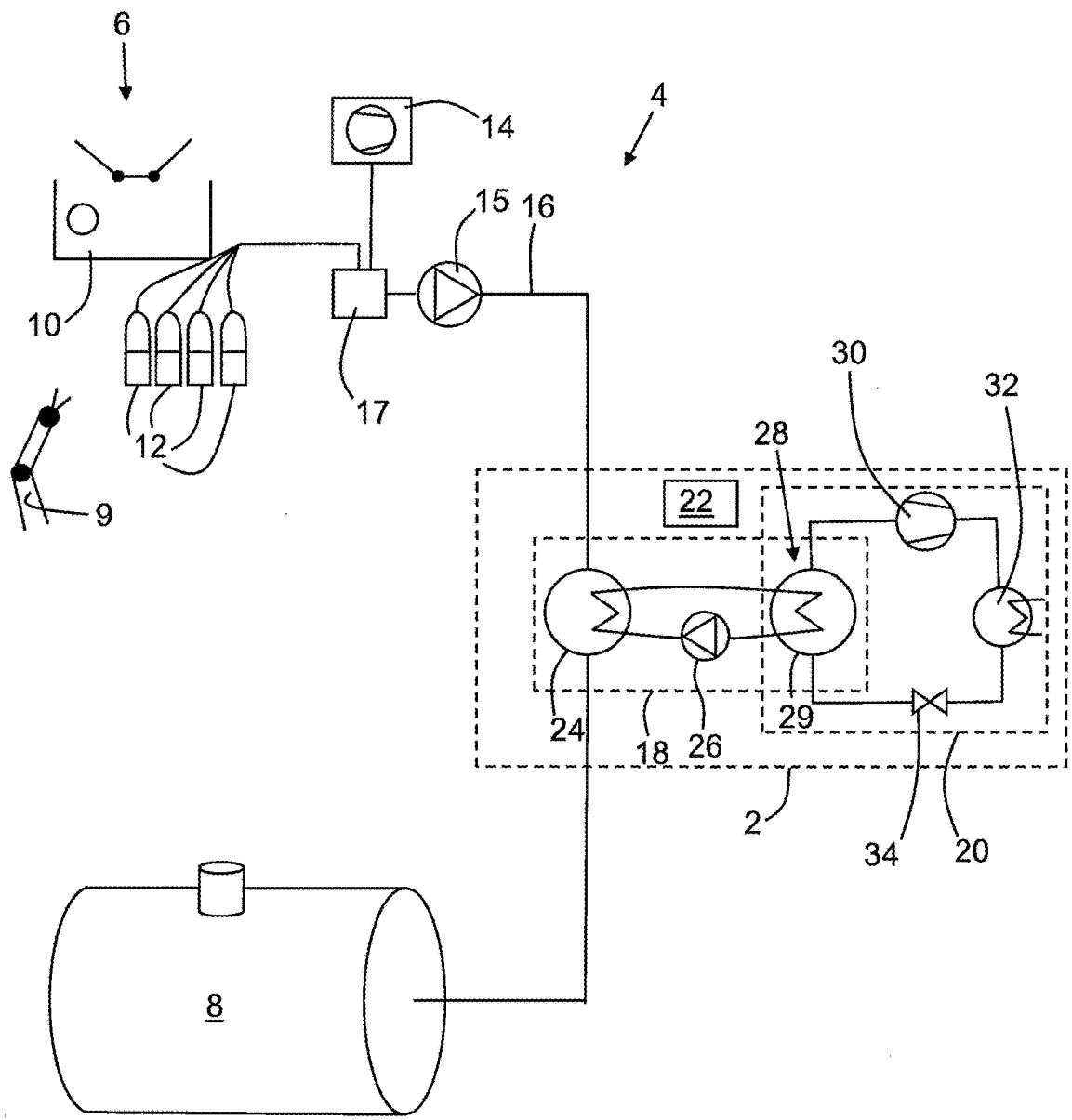
FIG. 1 schematically illustrates embodiments of a milk cooling apparatus and a milking arrangement.

FIG. 1 schematically illustrates embodiments of a milk cooling apparatus 2 and a milking arrangement 4. The milk cooling apparatus 2 is configured for cooling milk in the milking arrangement 4. The milking arrangement 4 comprises a milking system 6 for extracting milk from at least one animal, the milk cooling apparatus 2 for cooling milk, and a milk storage tank 8. The milking system may be an automatic milking system, AMS, comprising a robot arm 9 for automatic attachment of teat cups 12 to the teats of animals. Alternatively, the milking system 6 may be a milking system wherein teat cups are manually attached to the teats of animals.

The milking system 6 is configured for extracting milk from the teats of animals standing in a milking parlour 10.

The milking parlour 10 may be configured for housing one animal only as shown in FIG. 1, or the milking parlour may be configured for housing more than one animal simultaneously. The milking system 6 comprises teat cups 12 and a vacuum system 14 operated in a known manner. Milk extracted in the milking system 6 is led via a conduit 16 to the milk storage tank 8. The milk storage tank 8 may be a tank having its own cooling system, or a tank without a cooling system. In the latter case the milk storage tank 8 has to be well insulated in order to maintain the milk therein at a sufficiently low temperature until it is collected. Alternatively, the milk storage tank 8 may be a mobile tank, such as a tank of a dairy truck or a dairy trailer, which after filling is driven to the dairy.

The milking system 6 comprises a milk pump 15 configured to produce a milk flow from the milking system 6 towards the milk storage tank 8. Milk may be collected in a container 17 of the milking system 6, from which container 17 the milk is pumped by the milk pump 15 towards the milk storage tank 8. In embodiments wherein the milking system 6 comprise an AMS, for one animal, the container 17 may be an end unit or a receiver, where from milk is pumped by the milk pump 15 after milking of an animal has ended. In embodiments wherein the milking system 6 is configured for milking several animals at once, the container 17 may be a balance tank. Milk may be pumped from the balance tank by the milk pump 15 once the balance tank is filled to a certain degree. The balance tank may be provided with a level sensor to detect the level of milk in the tank. The latter type of milking system may be a milking system wherein teat cups are attached manually to the animals, or a larger automatic milking system.

In the milk storage tank 8 the milk is stored at a storage temperature. The storage temperature may be within a range of 2-5° C., or 2-7° C., or approximately 4° C., depending e.g. on local conditions and legislation. The milk cooling apparatus 2 may be configured for cooling milk to the milk storage temperature. If the milk storage tank 8 comprises its own cooling system, the milk cooling apparatus 2 may be configured for cooling milk to within a few degrees, e.g. within a range of maximum 5° C., of the storage temperature. Such cooling to the milk storage temperature, or to close to the milk storage temperature, may be referred to as instant cooling. In this context it may be mentioned that so-called pre-cooling only brings down the milk temperature partially towards the milk storage temperature, e.g. reaching a milk temperature of 15-20° C. after pre-cooling.

The milk cooling apparatus 2 comprises a coolant circuit 18, a refrigerant circuit 20, and a milk cooling apparatus controller 22. The milk cooling apparatus controller 22 may be a dedicated controller for the milk cooling apparatus 2. Alternatively, the milk cooling apparatus controller 22 may form part of a controller of the milking system 6 and/or a controller of the milk storage tank 8. The milk cooling apparatus controller 22 may comprise two or more separate control units, each of the control units being configured to control separate parts of the milk cooling apparatus 2. The one or more separate control units may be configured to communicate with each other or to operate independently of each other without communicating with each other. The milk cooling apparatus controller 22 may comprise a processor and one or more sensors connected to the processor. Such sensors may be e.g. temperature sensors, or pressure sensors. The processor may communicate with various components of the milk cooling apparatus 2. The processor may be configured to execute computer code in order to interpret input from the sensors and to output control commands to the various components of the milk cooling apparatus 2.

The coolant circuit 18 is configured for heat exchange between milk flowing in a milk flow from the milking system 6 to the milk storage tank 8 and a coolant. The refrigerant circuit 20 is configured for heat exchange between a refrigerant circulating in the refrigerant circuit 20 and the coolant circulating in the coolant circuit 8. The coolant is an intermediate liquid for transfer of heat from the milk milked the milking system to the refrigerant. The refrigerant is a fluid which utilises a phase change, from liquid to gas, to draw heat from the coolant in a refrigeration cycle. Accordingly, the milk is cooled by the refrigerant, indirectly via the coolant. According to embodiments, the coolant may comprise water and an anti-freeze substance. In this manner the coolant may be cooled to sub-zero degrees Celsius temperatures by the refrigerant without risk freezing. The anti-freeze substance may be e.g. propylene glycol.

According to embodiments, the coolant circuit 18 may comprise a first heat exchanger 24 arranged for heat exchange between a coolant and milk, a coolant pump 26 configured for circulating the coolant in the coolant circuit 18, and a heat exchanger arrangement 28 for heat exchange between the coolant and a refrigerant in the refrigerant circuit 20. The first heat exchanger 24 may be configured to be arranged in a conduit 16 leading from the milking system 6 to the milk storage tank 8. Thus, when the coolant circulates in the coolant circuit 18, the coolant may cool the milk flow from the milking system 6 while the coolant simultaneously is cooled by the refrigerant in the refrigerant circuit 20.

In order to mention a few examples, the coolant circuit 18 may comprise the coolant in an amount within a range of 20-1000 litres, or within a range of 20-200 litres, or within a range of 40-120 litres. The amount of coolant may suitably be selected based on the expected milk flow from the milking system 6 to the milk storage tank 8. Several hundreds of litres may be used in milking arrangements comprising a milking parlour wherein many animals, such as e.g. 20-100 animals, are milked simultaneously, which results in a high milk flow to the milk storage tank 8. The lower exemplified ranges of coolant suffice in milking arrangements where only one animal at a time or only a few animals are milked simultaneously. The cooling capacity if the refrigerant circuit 20 is adapted to the expected milk flow and depends inter alia on the number of animals milked simultaneously in the milking system 6.

The refrigerant circuit 20 comprises a compressor 30, a condenser 32, an expansion device 34 and the heat exchanger arrangement 28. In these embodiments, the heat exchanger arrangement 28 comprises a second heat exchanger 29, which forms an evaporator in the refrigerant circuit 20. In a known manner a refrigerant circulates in the refrigerant circuit 20. Gaseous refrigerant is compressed in the compressor and cooled in the condenser 32, such that the refrigerant condenses into liquid form. The liquid refrigerant undergoes a pressure drop as it passes the expansion device 34 and evaporates in the evaporator/second heat exchanger 29 by drawing heat from the coolant, which in turn is cooled by the refrigerant.

The milk cooling apparatus controller 22 is configured to perform a number of control measures:

Control the refrigerant circuit 20 to maintain a predefined temperature range in at least one portion of the refrigerant circuit 20 or in at least one portion of the coolant circuit 18. Such a temperature control may be performed by a separate control circuit of the milk cooling apparatus controller 22, dedicated specifically to the control of the refrigerant circuit 20. The at least one portion of the refrigerant circuit 20 may be e.g. a portion of the refrigerant circuit 20 between the expansion device 34 and the second exchanger 28, or a portion of the refrigerant circuit 20 in or after the heat exchanger arrangement 28. The at least one portion of the coolant circuit 18 may be e.g. a portion of the coolant circuit 18 at the heat exchanger arrangement 28 between the refrigerant circuit 20 and the coolant circuit 18. The predefined temperature range may be maintained indirectly via a control of the pressure in a portion of the refrigerant circuit 20.

Receive a first signal relating to commencement or increase of a milk flow from the milking system 6 towards the milk storage tank 8. The first signal may be triggered in response to at least one of a number of different events, states, or occasions in the milking arrangement 4, which event, state, or occasion relates directly or indirectly to the commencement or increase of a milk flow from the milking system 6 as will be discussed below with reference to different example embodiments.

Control circulation of coolant in the coolant circuit 18 in response to the first signal. Such control of circulation of coolant may comprise one or more of starting a circulation of coolant, providing a low coolant flow rate, providing a high coolant flow rate, controlling a coolant flow rate, and stopping coolant flow. This may be achieved by controlling the coolant pump 26.

Start or increase circulation of coolant in the coolant circuit 18 in response to the first signal. Thus, coolant cooled by the refrigerant in the refrigerant circuit 20 is readily available for cooling the milk once the milk flow reaches the first heat exchanger 24 of the coolant circuit 18 for heat exchange between the coolant and the milk.

Stop or decrease the milk flow from the milk milking system 6. The milk flow may be stopped e.g. when all milk at the milking system 6 has been pumped to the milk storage tank 8. The milk flow may be e.g. decreased when the level of milk in the container 17 (balance tank) is lower than a threshold.

Stop or decrease circulation of coolant in the coolant circuit 18. In response thereto the refrigerant circuit will be switched off once the refrigerant in the at least one portion of the refrigerant circuit or the coolant in the at least one portion of the coolant circuit is within the predefined temperature range.

According to some embodiments, the circulation of coolant may be stopped substantially immediately in connection with stopping of the milk flow from the milking system 6. According to some embodiments, the milk cooling arrangement controller 22 may verify that the milk has stopped flowing from the milking system 6 prior to stopping circulation of the coolant in the coolant circuit 18. According to alternative embodiments, the milk cooling apparatus controller 22 may be configured to stop circulation of coolant in the coolant circuit 18 when the coolant reaches or falls below a first threshold temperature. In this manner, the coolant may be brought down to the first threshold temperature before the circulation of coolant is stopped. A temperature may be selected as the first threshold temperature, which temperature is a suitable temperature for the coolant to have when the first signal is received again.

Refrigerant circulates in the refrigerant circuit 20 as long as the compressor 30 runs. Thus, when cooling of the coolant is not required, the milk cooling apparatus controller 22 stops the compressor 30. A temperature sensor (not shown) may be arranged e.g. in or at the heat exchanger arrangement 28. The temperature sensor may be utilised in determining when the first threshold temperature is reached. The temperature sensor may be utilised in determining other threshold temperatures, such as a second threshold temperature may be utilised when the milk cooling apparatus 2 is not cooling milk but is in standby for commencement of a milk flow from the milking system 6. The temperature sensor may also be utilised in determining the predefined temperature range for controlling the refrigerant circuit 20 as such.

The predefined temperature range of the refrigerant circuit may be automatically maintained by the milk cooling apparatus controller 22. A soon as the coolant temperature in the at least one portion of the refrigerant circuit 20 or in the at least one portion of the coolant circuit 18 exceeds the temperature range, the compressor 30 is run such that refrigerant circulates in the refrigerant circuit 20. Suitably, the refrigerant circuit 20 has a cooling/refrigeration capacity sufficient for the highest expected milk flow from the milking system 6. The cooling capacity of the refrigeration system 20 is utilised to cool the milk via the coolant in the coolant circuit 18. If the refrigerant circuit 20 is not running, the milk flow cannot be cooled. In contrast, other types of prior art milk cooling arrangements utilise a large batch of ice prepared prior to the start of a milk session involving milking of a number of animals. Ice is only again prepared after milking of all the animals has finished and prior to a subsequent milking session.

Figure 1A:
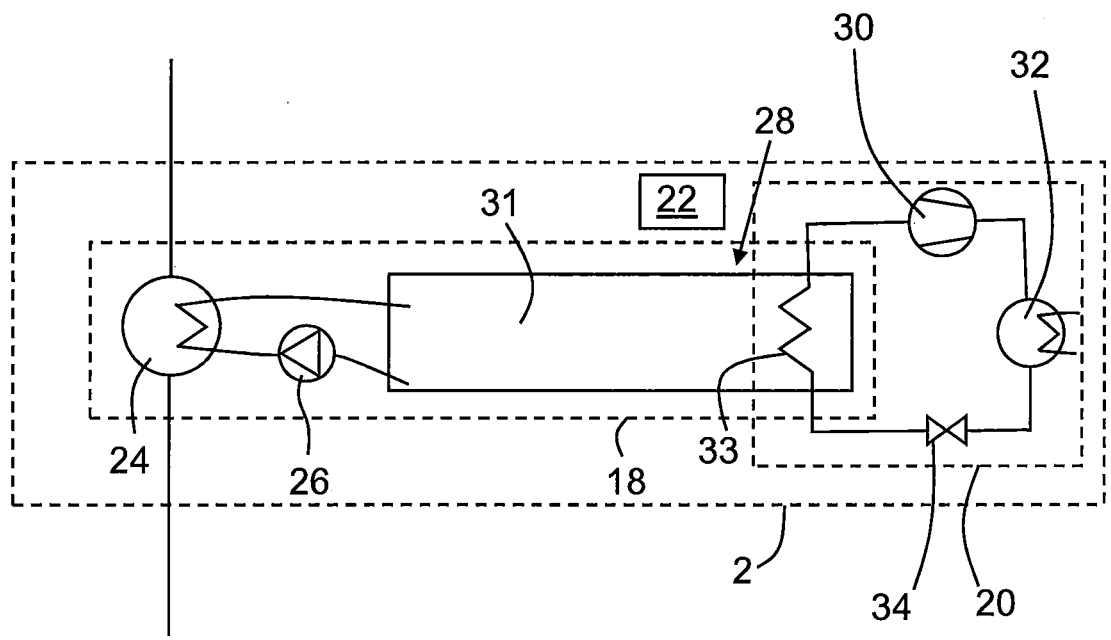
FIGS. 1a and 1b illustrate alternative embodiments of milk cooling apparatuses, and FIG. 2 illustrate embodiments of methods for cooling milk in a milking arrangement.
Figure 1B:
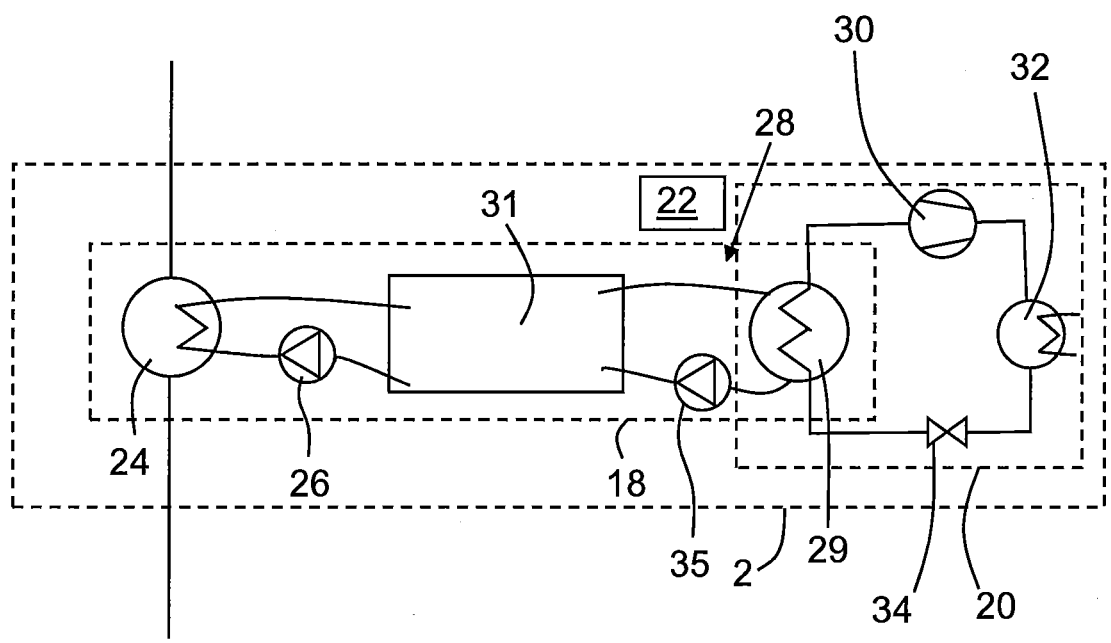

FIGS. 1a and 1b illustrate alternative embodiments of milk cooling apparatuses 2. The embodiments of FIGS. 1a and 1b resemble in much the embodiments of FIG. 1. It is mainly the heat exchange arrangement 28, which differs in the embodiments of FIGS. 1a and 1b. In the following these differences will be discussed.

In the embodiments of FIG. 1a the heat exchanger arrangement 28 comprises a buffer tank 31 for coolant. An evaporator 33 of the refrigerant circuit 20 is arranged in the buffer tank 31. As the refrigerant circulates in the refrigerant circuit 20, the coolant in the buffer tank 31 is cooled. The coolant is circulated by the coolant pump 26 in the coolant circuit 18, from the buffer tank 31 to the first heat exchanger 24, and back to the buffer tank 31. Suitably, the buffer tank 31 is insulated. An agitator (not shown) may be arranged in the buffer tank 31 for preventing thermal stratification in the buffer tank 31. The buffer tank 31 may be arranged for holding the above discussed amounts of coolant.

In the embodiments of FIG. 1b the heat exchanger arrangement 28 again, comprises a buffer tank 31 for coolant. Again, the coolant is circulated by the coolant pump 26 in the coolant circuit 18, from the buffer tank 31 to the first heat exchanger 24, and back to the buffer tank 31. A second heat exchanger 29 is arranged for heat exchange between the coolant the refrigerant. Accordingly, the second heat exchanger 29 forms an evaporator of the refrigerant circuit 20. The coolant circuit 18 comprises a further coolant pump 35 for circulating the coolant from the buffer tank 31 to the second heat exchanger 29, and back to the buffer tank 31. Suitably, the buffer tank 31 is insulated. An agitator (not shown) may be arranged in the buffer tank 31 for preventing thermal stratification in the buffer tank 31. The buffer tank 31 may be arranged for holding the above discussed amounts of coolant.

Figure 2:
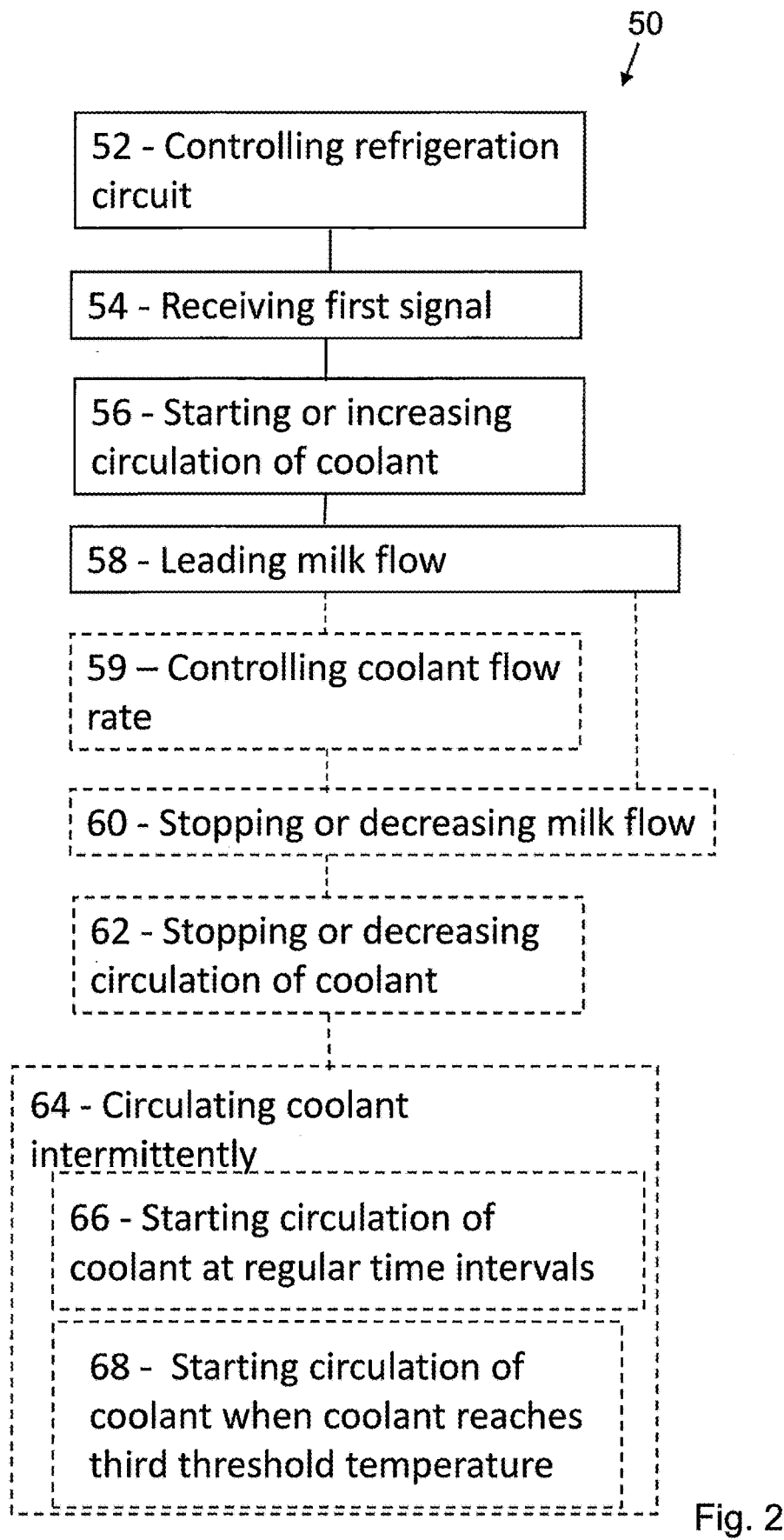

FIG. 2 illustrates embodiments of a method 50 for cooling milk in a milking arrangement. The milking arrangement may be a milking arrangement 4 as discussed above in connection with FIGS. 1-1b. Reference is made to FIGS. 1-2 in the following. Accordingly, the method 50 is performed in a milking arrangement 4 comprising a milking system 6 for extracting milk from at least one animal, a milk cooling apparatus 2 for cooling milk, and a milk storage tank 8. The milk cooling apparatus 2 is arranged in a milk flow path between the milking system 6 and the milk storage tank 8 and comprises a coolant circuit 18 and a refrigerant circuit 20. The coolant circuit 18 is configured for heat exchange between milk and a coolant and the refrigerant circuit 20 is configured for heat exchange between a refrigerant and the coolant.

The method 50 comprises steps of:

Controlling 52 the refrigerant circuit 20 to maintain a predefined temperature range in at least one portion of the refrigerant circuit 20 and/or in at least one portion of the coolant circuit 18. The at least one portion of the refrigerant circuit 20 may be in or at the heat exchanger arrangement 28. The at least one portion of the coolant circuit 18 may for instance be in or at the heat exchanger arrangement 28. An automatic control of the refrigerant circuit 20 may thus be achieved.

Receiving 54 a first signal relating to commencement or increase of a milk flow from the milking system 6 towards the milk storage tank 8. Thus, it is indicated that a milk flow, which requires cooling will commence or increase. The milk flow may commence or increase immediately upon receipt of the first signal. Alternatively, the milk flow may commence or increase within a time period of receipt of the first signal.

Starting or increasing 56 circulation of coolant in the coolant circuit in response to the first signal. This may be achieved by controlling the coolant pump 26 and optionally by controlling the further coolant pump 35 in embodiments comprising a further coolant pump 35. Such control may involve simple on and off switching of the coolant pump, or coolant pumps, which rotate/s at a constant speed. Alternatively, the coolant pump, or pumps, may be speed controlled to provide a variable flow rate of coolant, at least through the first heat exchanger 24. In the latter case, e.g. a low flow rate may be used during periods of no milk flow to the storage tank. The low flow rate may be increased to one or more higher flow rates during periods of milk flow to the storage tank.

Leading 58 the milk flow through the milk cooling apparatus 2. This may be achieved by the milk flow following the milk flow path from the milking system 6 to the milk storage tank 8. For instance, milk from the milking system 6 may be pumped by the milk pump 15 from the milking system 6 through conduits 16 forming the milk flow path to the milk storage tank 8.

According to embodiments, the method 50 may comprise steps of:

Stopping or decreasing 60 the milk flow from the milking system 6. Stopping the milk flow may be done when e.g. all the milk in the milking system has been pumped from the milking system. Alternatively, the milk flow may be stopped e.g. when only a predetermined amount of milk remains in the milking system.

Stopping or decreasing 62 circulation of coolant in the coolant circuit 18. For instance, the coolant pump 26 may be stopped. Alternatively, the circulation of coolant is decreased to a low flow. Thus, also the refrigerant circuit 20 will stop cooling the coolant in the cooling circuit 18 as soon as the at least one portion of the refrigerant circuit 20 or the at least one portion of the coolant circuit 20 has a temperature within the predefined temperature range. Thus, energy may be saved during periods when there is no milk flow to the milk storage tank 8.

According to embodiments method may comprise after the step of leading 58 the milk flow through the milk cooling apparatus a step of:

Controlling 59 a flow rate of the coolant in the coolant circuit 18. This may be achieved by the coolant pump, or pumps 26, 35, being speed controlled to provide a variable flow rate of coolant, at least through the first heat exchanger 24. The milk cooling apparatus controller 22 may control the coolant pump, or pumps 26, 35. The flow rate of the coolant may be controlled e.g. based on the milk flow rate through the first heat exchanger 24. The milk pump 15 may provide various milk flow rates.

According to embodiments, the step of stopping or decreasing 62 circulation of coolant in the coolant circuit 18 may be performed when a temperature of the coolant reaches or falls below a first threshold temperature. In this manner circulation of coolant in the coolant circuit 18 is continued after the milk flow from the milking system 6 has stopped, until the first threshold temperature has been reached. Thus, it may be ensured that all the coolant in the coolant circuit 18 is at or below the first threshold temperature after finishing cooling the milk flow from the milking system 6. The first threshold temperature may be e.g. a temperature sufficient for cooling a milk flow from the milking system 6. Thus, the milk cooling apparatus 2 may be prepared for cooling a subsequent milk flow from the milking system 6 once a first signal is received again.

According to embodiments the method 50 may comprise, during a time period when there is an absence of the first signal, a step of:

circulating 64 the coolant intermittently in the coolant circuit 18 until the coolant is at or below a second threshold temperature. In this manner it may be ensured that the coolant has a suitable temperature once the first signal is received.

According to embodiments, the second threshold temperature may be the same as the first threshold temperature. In this manner the milk cooling apparatus 2 may be ready for cooling a milk flow from the milking system 6 once a first signal is received. Alternatively, the second threshold temperature may be a temperature higher or lower than the first threshold temperature. A higher temperature may be chosen such that the coolant reaches a temperature sufficient to cool a milk flow from the milking system 6 as soon as the milk flow reaches the milk cooling apparatus 2 after the first signal has been received. A lower temperature may be chosen such that it will take a certain time period for the temperature of the coolant to rise to the first threshold temperature.

According to embodiments, the step of circulating 64 the coolant intermittently may comprise a step of:

starting 66 circulation of the coolant at regular time intervals. In this manner the coolant temperature may be maintained within a certain temperature range. Thus, the coolant may be maintained at a suitable temperature when the first signal is received. The length of the time intervals may be selected depending on local conditions, such as e.g. an ambient temperature.

According to embodiments, the step of circulating 64 the coolant intermittently may comprise a step of:

starting 68 circulation of the coolant when a temperature of the coolant reaches a third threshold temperature. In this manner the coolant temperature may be maintained within a certain temperature range in the coolant circuit 18. Thus, the coolant may be maintained at a suitable temperature when the first signal is received. The third threshold temperature may be higher than the second threshold temperature and may be selected such that a suitable temperature range is present between the second and third threshold temperatures.

In the following non-exhaustive examples of triggering the first signal are listed:

According to some embodiments, the first signal may correlate with a start or increase of pumping of milk from the milking system 6 towards the milk storage tank 8. The first signal may be provided when the milk pump 15 of the milking system 6 is started, or a predetermined time period before or after the milk pump 15 is started.

According to some embodiments, the first signal may relate to a time period until commencement or increase of the milk flow from the milking system 6. There are a number of events in a milking system 6 which preceded a milk flow from the milking system 6, which events occur within a predefined period of a start of milk flow. The time period need not be an exact time period but may be an approximate time period. Just to mention a few, such events may be one or more animals entering or leaving a milking parlour, a gate of a milking parlour opening or closing, feed being distributed to an animal in a milking parlour, a teat cup being attached to a teat of an animal, et cetera.

According to some embodiments, the first signal may relate to an animal approaching or entering an automatic milking system, AMS. Determining that an animal approaches or enters an AMS may e.g. be done by a camera, by detecting that a gate is opening or closing, by determining that feed is being distributed to the animal, just to name a few.

According to embodiments, wherein the milking system 6 comprises a balance tank for intermediate storage of milk prior to being conducted to the milk storage tank 8, the first signal may relate to a filling degree of the balance tank. A certain filling degree of the balance tank (i.e. the volume of milk stored in the tank) may namely trigger start of milk being pumped from the milking system 6. The balance tank may be a container at 17, as illustrated in FIG. 1. According to these embodiments, the circulation of coolant in the coolant circuit 18 may be controlled based on the filling degree of the balance tank, such that an increase in the filling degree of the balance tank results in an increase in the circulation of coolant in the coolant circuit. This may be done stepless (i.e. continuously) or stepwise, e.g. that at predefined threshold levels of the degree of filling the capacity of the cooling apparatus is increased by increasing the circulation of coolant in the coolant circuit (18). Similarly, at a decreasing degree of filling of the balance tank the circulation of coolant in the coolant circuit may be decreased, stepless or stepwise.

In one and the same milking arrangement the first signal may be triggered by not only one event but by different events, which may depend on the current operating condition of the milking system.

The method may further comprise the steps of sensing the temperature of milk downstream of the milk cooling apparatus 2, and controlling the speed of milk flow from the milking system 6 towards the milk storage tank 8 in response to the sensed temperature. According to the embodiments comprising a balance tank 17, where the control of the circulation of coolant in the coolant circuit is stepwise, the speed of milk flow may be controlled to result in the milk being in a predetermined temperature range.

As an illustrative example, the first signal relating to commencement or increase of a milk flow may be related to the filling of the balance tank being at a first level. At filling levels below the first level, the milk flow is off and the circulation of coolant in the coolant circuit 18 is not yet started. When the level of filling of the balance tank exceeds the first level, the first signal is generated and the coolant in the coolant circuit 18 is started in response to the first signal. The circulation of coolant in the coolant circuit may be maintained at a predetermined level. The temperature of the milk is measured downstream of the milk cooling apparatus. Until the level of filling of the balance reaches a second level, higher than the first level, the speed of milk flow from the milking system 6 towards the milk storage tank is regulated such that the temperature of the milk is in a predetermined range (e.g. 2-5° C.), or regulated towards a set temperature (e.g. 2° C. or 4° C.). The regulating of the speed of milk flow is done by controlling the speed of the milk pump 15. When reaching the second level of filling of the balance tank the circulation of coolant in the coolant circuit is increased to a second predetermined level, and again the speed of milk flow from the milking system 6 towards the milk storage tank is regulated such that the temperature of the milk is in a predetermined range (e.g. 2-5° C.), or regulated towards a set temperature (e.g. 2° C. or 4° C.).

Alternatively, the speed of milk flow and the speed of circulation of coolant in the coolant circuit are both regulated continuously such that the temperature of the milk measured downstream of the milk cooling apparatus is in a predetermined range (e.g. 2-5° C.), or regulated towards a set temperature (e.g. 2° C. or 4° C.).

It is to be understood that the foregoing is illustrative of various example embodiments and that the invention is defined only by the appended claims. A person skilled in the art will realize that the example embodiments may be modified, and that different features of the example embodiments may be combined to create embodiments other than those described herein, without departing from the scope of the present invention, as defined by the appended claims.

The invention claimed is:

1. A method (50) for automatically cooling milk in a milking arrangement (4) provided with a milk storage tank (8) and a milking system (6) for extracting milk from at least one animal, by means of a milk cooling apparatus (2) for cooling the milk, where the milk cooling apparatus (2) is arranged in a milk flow path between the milking system (6) and the milk storage tank (8), and the milk cooling apparatus (2) includes a coolant circuit (18) and a refrigerant circuit (20), the coolant circuit (18) configured for heat exchange between the milk in the milk flow path and a coolant in the coolant circuit, and the refrigerant circuit (20) is configured for heat exchange between a refrigerant in the refrigerant circuit and the coolant in the coolant circuit, the method (50) comprising the steps of:

maintaining, via control of the refrigerant circuit via a milk cooling controller and in absence of a first signal from the milking system and associated with a milk flow along the milk flow path from the milking system (6) towards the milk storage tank (8), a first predefined temperature range in a portion of the coolant circuit (18), the controller controlling the coolant circuit (18)

to operate in a first mode where the circulation of the coolant is either stopped or decreased;

receiving (54) at the controller the first signal from the milking system (6);

responsive to the receiving (54) of the first signal, the controller automatically operates to control the coolant circuit (18) to operate in a second mode whereby the circulation of the coolant is either started or increased (56);

leading (58) the milk flow through the milk cooling apparatus (2);

sensing, via a sensor in communication with the controller, a temperature of the milk downstream of the milk cooling apparatus (2); and responsive to the sensed temperature of the milk downstream of the milk cooling apparatus (2), the controller automatically operates to control a speed of the milk flow along the milk flow path from the milking system (6) towards the milk storage tank (8) to maintain the milk in a second predefined temperature range downstream of the milk cooling apparatus (2).

2. The method (50) according to claim 1, further comprising:

stopping or decreasing (60) the milk flow from the milking system (6); and responsive to the stopping or decreasing (60) of the milk flow from the milking system (6), controlling, via the controller, the coolant circuit to operate in the first mode by stopping or decreasing (62) the circulation of the coolant in the coolant circuit (18) while continuing to control the refrigerant circuit to maintain the first predefined temperature range in the portion of the coolant circuit.

3. The method (50) according to claim 2, wherein the step of stopping or decreasing (62) circulation of the coolant in the coolant circuit (18) is performed when a temperature of the coolant reaches or falls below a first threshold temperature.

4. The method (50) according to claim 1, further comprising, during a time period when there is the absence of the first signal from the milking system, a step of:

intermittently circulating (64) the coolant in the coolant circuit (18) until the coolant is at or below a second threshold temperature.

5. The method (50) according to claim 4, wherein the step of intermittently circulating (64) the coolant comprises a step of:

circulating the coolant at regular time intervals.

6. The method (50) according to claim 4, wherein the step of intermittently circulating (64) the coolant further comprises a step of:

circulating the coolant when a temperature of the coolant reaches a third threshold temperature.

7. The method (50) according to claim 1, wherein the first signal is generated by the milking system as a result of a start of pumping the milk from the milking system (6) towards the milk storage tank (8).

8. The method (50) according to claim 1, wherein the first signal relates to a time period until commencement of the milk flow from the milking system (6).

9. The method (50) according to claim 1, wherein the milking system (6) is an automatic milking system (AMS).

10. The method (50) according to claim 9, wherein the first signal is generated responsive to an animal approaching or entering the AMS.

11. The method (50) according to claim 1, wherein the milking system (6) also includes a balance tank (17) for intermediate storage of milk prior to being conducted to the milk storage tank (8), and the first signal is generated responsive to a degree of a filling of the balance tank (17).

12. The method (50) according to claim 11, wherein the circulation of the coolant in the coolant circuit (18) is controlled based on the degree of the filling of the balance tank (17).

13. The method (50) according to claim 1, wherein the first signal is generated responsive to any of a commencement and an increase of a milk flow from the milking system (6) towards the milk storage tank (8).

14. A milk cooling apparatus (2) for cooling milk in a milking arrangement (4) equipped with a milk storage tank (8) and a milking system (6) for extracting milk from at least one animal, the milk cooling apparatus (2) comprising:

a coolant circuit (18);

a refrigerant circuit (20);

a controller (22) configured to communicate with the milking system (6); and a sensor, in communication with the controller (22), configured to sense a temperature of the milk downstream of the milk cooling apparatus, wherein the coolant circuit (18) is configured for heat exchange between the milk and a coolant that circulates through the coolant circuit (18), wherein the refrigerant circuit (20) is configured for heat exchange between a refrigerant that circulates through the refrigerant circuit (20) and the coolant of the coolant circuit (18), and wherein the controller (22) is configured to:

during absence of a first signal from the milking system (6) and associated with a commencement and an increase of a milk flow from the milking system (6) towards the milk storage tank (8), control the refrigerant circuit (20), to maintain a first predefined temperature range in a portion of the coolant circuit (18) and control the coolant circuit (18) to operate in a first mode where the circulation of the coolant is either stopped or decreased, responsive to receiving the first signal from the milking system (6), control the coolant circuit (18) to operate in a second mode whereby the circulation of the coolant is either started or increased in the coolant circuit (18), sense, via the sensor, a temperature of the milk downstream of the milk cooling apparatus (2), and in response to the temperature of the milk downstream of the milk cooling apparatus (2) sensed by the sensor, control a speed of the milk flow from the milking system (6) towards the milk storage tank (8) to maintain the milk in a second predefined temperature range downstream of the milk cooling apparatus (2).

15. The milk cooling apparatus (2) according to claim 14, wherein the coolant circuit (18) comprises each of a first heat exchanger (24) arranged for heat exchange between the coolant and the milk, a coolant pump (26) configured for circulating the coolant in the coolant circuit (18), and a heat exchanger arrangement (28) for heat exchange between the coolant and the refrigerant of the refrigerant circuit (20), and wherein the first heat exchanger (24) is configured to be arranged in a conduit (16) leading from the milking system (6) to the milk storage tank (8).

16. The milk cooling apparatus (2) according to claim 14, wherein the coolant comprises water and an anti-freeze substance.

17. The milk cooling apparatus (2) according to claim 14, wherein the controller (22) is further configured to control the coolant circuit, in response to a determination that the milk flow has stopped, to operate in the first mode by stopping or decreasing the circulation of the coolant in the coolant circuit (18) while continuing to control the refrigerant circuit (20) to maintain the first predefined temperature range in the portion of the coolant circuit (18).

* * * * *